United States Patent
Berdy et al.

(10) Patent No.: US 10,602,353 B1
(45) Date of Patent: Mar. 24, 2020

(54) EXTENSIBLE DEVICE IDENTITY ATTESTATION

(71) Applicant: Microsoft Technology Licensing, LLC, Redmond, WA (US)

(72) Inventors: Nicole Elaine Berdy, Kirkland, WA (US); Alexander Tolpin, Redmond, WA (US); Tamer Awad, Redmond, WA (US); Rajeev Mandayam Vokkarne, Sammamish, WA (US); Puneet Gupta, Jersey City, NJ (US); Timothy James Larden, Bellevue, WA (US); Jelani Z. Brandon, Woodinville, WA (US); SachinKumar Chandramohan, Irvine, CA (US); Mounica Arroju, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/237,393

(22) Filed: Dec. 31, 2018

(51) Int. Cl.
*H04W 12/00* (2009.01)
*H04W 4/50* (2018.01)
(Continued)

(52) U.S. Cl.
CPC ........ *H04W 12/0023* (2019.01); *G06F 21/44* (2013.01); *G06F 21/57* (2013.01);
(Continued)

(58) Field of Classification Search
CPC ........ G06F 21/57; G06F 21/50; H04W 12/08; H04W 12/06; H04W 12/0806
See application file for complete search history.

(56) References Cited

U.S. PATENT DOCUMENTS 8,850,588 B2    9/2014  Kumar et al.
8,935,808 B2 *  1/2015  Barbir ................ H04L 63/0815
                                                                726/28
(Continued)

OTHER PUBLICATIONS

"Compromised Device Detection with Health Attestation", Retrieved <<https://docs.vmware.com/en/VMware-AirWatch/9.3/vmware-airwatch-guides-93/GUID-AW93-HealthAttestation.html>>, Retrieved on Nov. 14, 2018, 1 Page.
(Continued)

*Primary Examiner* — Dung Hong
(74) *Attorney, Agent, or Firm* — Holzer Patel Drennan

(57) ABSTRACT

Provisioning a requesting device is provided using extended identity attestation for the requesting device. A provisioning request is received at a device provisioning system. The provisioning request includes a registration identifier provided by the requesting device. A plurality of extended attestation components is accessed in an enrollment datastore of the device provisioning system. Each extended attestation component identifies an external computing system. One of the extended attestation components in the enrollment datastore is selected based on the received registration identifier. Execution of the device attestation is initiated at the external computing system identified by the selected extended attestation component to yield an attestation result. Satisfaction of a validity condition by the attestation result is detected. The requesting device is provisioned from the device provisioning system, responsive to detection that the attestation result satisfies the validity condition.

13 Claims, 4 Drawing Sheets

(51) Int. Cl.
*H04W 60/00* (2009.01)
*G06F 21/44* (2013.01)
*G06F 21/57* (2013.01)
*H04L 29/08* (2006.01)
*H04L 9/32* (2006.01)

(52) U.S. Cl.
CPC ............ *H04L 9/3234* (2013.01); *H04L 67/12* (2013.01); *H04W 4/50* (2018.02); *H04W 12/004* (2019.01); *H04W 60/00* (2013.01); *H04L 2209/127* (2013.01)

(56) References Cited

U.S. PATENT DOCUMENTS

| | | | | |
|---|---|---|---|---|
| 10,075,440 | B1* | 9/2018 | Arunkumar | H04L 63/102 |
| 2009/0013181 | A1* | 1/2009 | Choi | H04L 63/123 |
| | | | | 713/168 |
| 2014/0173754 | A1* | 6/2014 | Barbir | H04L 63/0815 |
| | | | | 726/28 |
| 2016/0253664 | A1* | 9/2016 | Yuan | G06F 21/445 |
| | | | | 705/71 |
| 2016/0323283 | A1* | 11/2016 | Kang | H04L 63/08 |
| 2017/0103209 | A1* | 4/2017 | Wooten | G06F 9/4406 |
| 2017/0316390 | A1* | 11/2017 | Smith | G06Q 20/407 |
| 2017/0324545 | A1* | 11/2017 | Brandenburger | H04L 9/006 |
| 2018/0069836 | A1* | 3/2018 | Mandyam | H04L 63/0853 |
| 2018/0198604 | A1* | 7/2018 | Hayton | G06F 15/0208 |
| 2018/0241560 | A1* | 8/2018 | Chen | G06F 21/577 |
| 2019/0080331 | A1* | 3/2019 | Howald | G10L 15/02 |
| 2019/0173873 | A1* | 6/2019 | Brown | G06F 16/93 |

OTHER PUBLICATIONS

"How blockchain can give us back control of our identity and help avoid another Facebook / Cambridge Analytica scandal", Retrieved <<https://medium.com/torque-capital-partners/how-blockchain-can-give-us-back-control-of-our-identity-and-help-avoid-another-facebook-cambridge-eda2fd7303ee>>, Retrieved on Nov. 14, 2018, 11 Pages.

Berdy, et al., "IoT Hub Device Provisioning Service device concepts", Retrieved <<https://docs.microsoft.com/en-us/azure/iot-dps/concepts-device>>, Sep. 5, 2017, 2 Pages.

"Application Filed in PCT Application No. PCT/US2019/012007", Filed on Jan. 1, 2019, 24 Pages.

Berdy et al., "Provisioning devices with Azure IoT Hub Device Provisioning Service," Posted Dec. 4, 2017 Retrieved from https://docs.microsoft.com/en-us/azure/iot-dps/about-iot-dps(6 pages).

Berdy, Nicole, "Device provisioning: Identity attestation with TPM," Posted Nov. 7, 2017, Retrieved from https://azure.microsoft.com/en-us/blog/device-provisioning-identity-attestation-with-tpm/(8 pages).

Berdy, Nicole, "Provision the device to an IoT hub using the Azure IoT Hub Device Provisioning Services," Posted Apr. 11, 2018, Retrieved from https://docs.microsoft.com/en-us/azure/iot-dps/tutorial-provision-device-to-hub(8 pages).

\* cited by examiner

EXTENSIBLE DEVICE IDENTITY ATTESTATION

BACKGROUND

Internet of Things (IoT) devices may be securely provisioned using a device provisioning service. For example, a smart door lock can connect to a device provisioning service designated by its manufacturer. The device provisioning service registers the smart door lock with an IoT hub and returns IoT hub connection information to the smart door lock. With this IoT hub connection information, the smart door lock can establish an initial connection with the IoT hub, which can apply the proper configuration to the smart door lock and establish interaction between the smart door lock and any appropriate IoT solutions (e.g., a security service, a home automation service). In the interest of security, such a device provisioning service will likely attempt to determine whether the device identity professed by the smart door lock is valid, so as to only provision validly-identified devices. However, existing solutions for determining the validity of a device identity by a device provisioning service are limited and not extensible, such as by the device user or the IoT solution provider.

SUMMARY

The described technology addresses such limitations by provisioning a requesting device using extended identity attestation for the requesting device. A provisioning request is received at a device provisioning system. The provisioning request includes a registration identifier provided by the requesting device. A plurality of extended attestation components is accessed in an enrollment datastore of the device provisioning system. Each extended attestation component identifies an external computing system. One of the extended attestation components in the enrollment datastore is selected based on the received registration identifier. Execution of the device attestation is initiated at the external computing system identified by the selected extended attestation component to yield an attestation result. Satisfaction of a validity condition by the attestation result is detected. The requesting device is provisioned from the device provisioning system, responsive to detection that the attestation result satisfies the validity condition.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
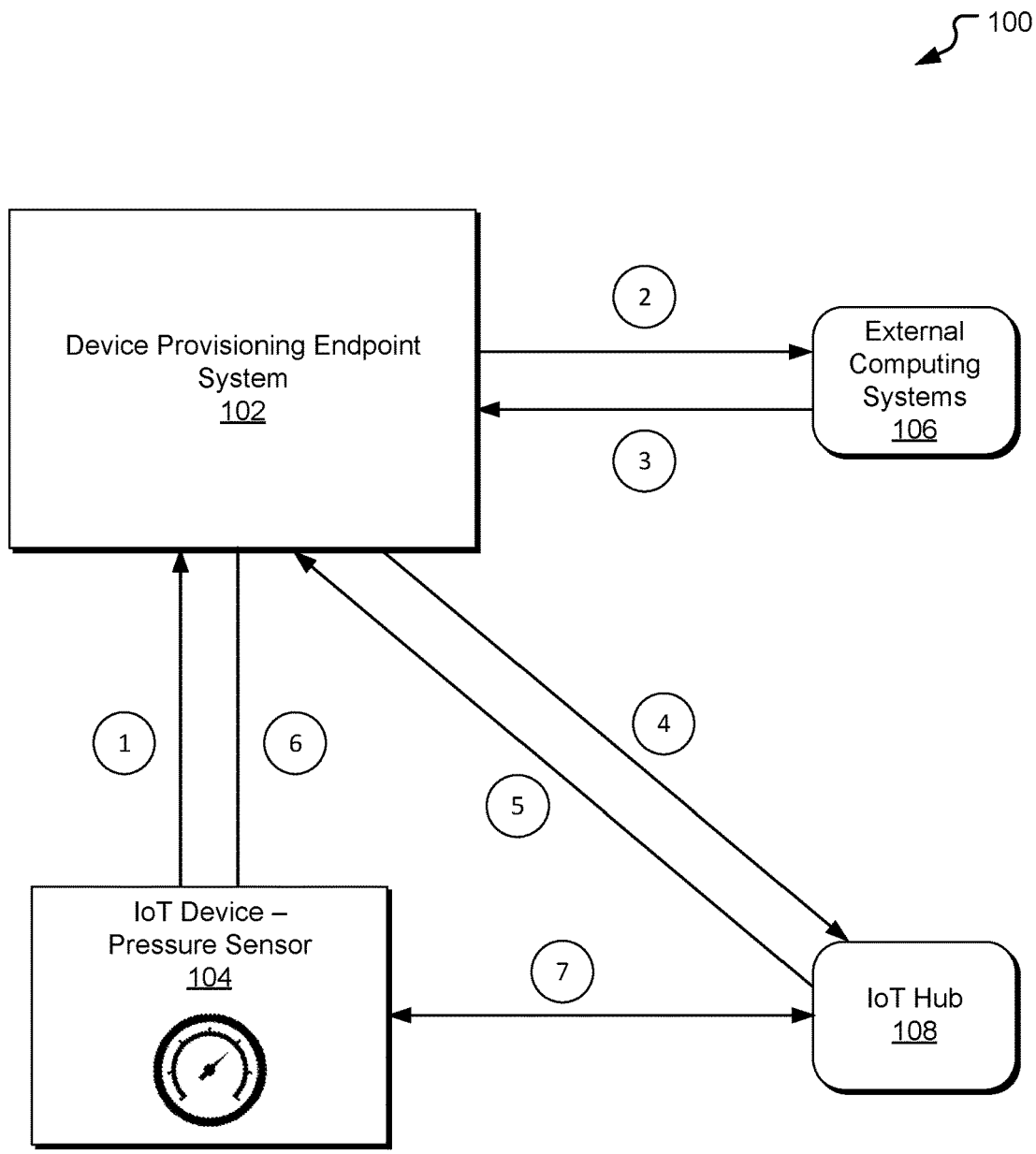
FIG. 1 illustrates an example system providing extensible device identity attestation.

IoT devices typically include a circuit board connected to input components (e.g., sensors) and/or output components (e.g., lights, a display) and are configured to be connected to the internet (e.g., via Wi-Fi or Bluetooth). Examples of IoT devices may include without limitation smart door locks, smart kitchen appliances, pressure sensors on a remote oil pump, temperature and humidity sensors in an air-conditioning unit, accelerometers in an elevator, and presence sensors in a room.

In various implementations, IoT devices can execute their own applications and connect to remote (e.g., back-end) services through an IoT hub. Such applications can send telemetry to the IoT hub, receive messages and updates from the back-end services via the IoT Hub, etc. Accordingly, IoT devices can communicate with back-end services in both directions. Example communications may include without limitation:

An IoT device may send temperature from a mobile refrigeration truck every 5 minutes to an IoT Hub.

A back-end service can ask an IoT device to send telemetry more frequently to help diagnose a problem.

An IoT device can send alerts based on the values read from its sensors. For example, if the IoT device is monitoring a batch reactor in a chemical plant, the IoT device sends an alert when the temperature exceeds a certain value.

An IoT device can send information to a dashboard for viewing by human operators. For example, a control room in a refinery may show the temperature and pressure of each pipe, as well as the volume flowing through that pipe, allowing the human operators to monitor these parameters.

One or more native or built-in device identity attestation components may be specified and/or performed on a device provisioning endpoint system executing a device provisioning endpoint service. However, this native device identity attestation approach presents limitations. For example, native device identity attestation is limited to those attestation components provided by the device provisioning endpoint service provider. Yet, third-parties may wish to develop, deploy, and support their own, potentially more sophisticated, device identity attestation components that they wish to offer as a service without providing access by the device provisioning endpoint service provider to such components themselves (e.g., to retain proprietary control and/or confidentiality over such components). In another implementation, the user of the IoT device may wish to specify a non-native identity attestation approach (e.g., by associating the IoT device with a non-native or third-party identity attestation solution). For example, a nuclear power plant may choose to perform identity attestation from a remote and secure datacenter of a regulated government entity, rather than from the device provisioning endpoint system. By extending the device provisioning endpoint system to support inclusion, selection, and execution of non-native device identity attestation components as part of its device provisioning endpoint service, IoT device provisioning can securely offer a more dynamic, and potentially more sophisticated, device identity attestation for associated IoT devices without requiring disclosure and/or execution of third-party identity attestation components at the device provisioning endpoint system itself.

FIG. 1 illustrates an example system 100 providing extensible device identity attestation. The example system 100 includes a device provisioning endpoint system 102 configured to provision a pressure sensor 104 (an example IoT device) using extensible device identity attestation. Provisioning may include without limitation connection to an IoT hub, configuration of the IoT device to interact the with other computing systems in or via the cloud, and registration with one or more IoT services/solutions. In the illustrated example, the pressure sensor 104 transmits a provisioning request to the device provisioning endpoint system 102 (e.g., in a communication phase 1, identified by the number "1" inside a circle in FIG. 1). In one implementation, the provisioning request includes a registration identifier purporting to identify the pressure sensor 104 and may also include additional data, such as an encrypted payload (e.g., encrypted using a private key of the pressure sensor 104). In other implementations, the provisioning request may include different data components used to validate and provision the pressure sensor 104. Such data components may include without limitation encrypted and signed data relating to the provisioning of the pressure sensor 104.

Responsive to receipt of the provisioning request, the device provisioning endpoint system 102 attempts to validate the purported identity of the pressure sensor 104 by obtaining identity attestation for the provided registration identifier In FIG. 1, the device provisioning endpoint system 102 accesses an enrollment datastore (not shown), for example, to look up the registration identifier in the enrollment datastore. If the registration identifier is found in the enrollment datastore, the device provisioning endpoint system 102 evaluates other records associated with the registration identifier to extract other relevant information, including without limitation, in at least one implementation, one or more identifiers of external computing systems 106 capable of performing identity attestation for the pressure sensor 104 and other IoT devices; identity and/or location data for an IoT hub associated with the pressure sensor 104; and instructive data defining protocols formats, and/or other parameters for communicating with the external computing systems 106 (e.g., an API definition). In such configurations, the external computing systems 106 are external of the device provisioning endpoint system 102, typically maintained in separate computing systems or data centers by third parties. An advantage of this external configuration is that the external computing systems 106 may be operated in a confidential environment by third parties. In this manner, the third parties can provide a proprietary identity attestation service without exposing the confidential assets to the device provisioning endpoint system 102.

The external computing system identifiers may be in various forms including without limitation uniform resource identifiers (URIs), IP (internet protocol) addresses, and datacenter node addresses that can be translated into private or virtual addresses within the datacenter. The enrollment datastore may include multiple external computing system identifiers, among which the device provisioning endpoint system 102 may select for extended device identity attestation.

Other records associated with the registration identifier may also be stored in the enrollment database. The other records may also include other security information relating to the pressure sensor 104, the associated IoT hub, the external computing systems 106, and/or the device provisioning endpoint system 102.

In one implementation, the device provisioning endpoint system 102 transmits an identity attestation request to the identified (and possibly selected) external computing system in a communication phase 2. The identity attestation request may be encrypted and include the registration identifier and other records from the enrollment datastore or other data from the provisioning request. For example, the identity attestation request may include the registration identifier and a signed and encrypted data payload for use in the identity attestation operations executed on the external computing system.

The identified external computing system executes its identity attestation operations on the registration identifier (and potentially other data) to determine the validity of the purported identity of the pressure sensor 104. Various methods of identity attestation may be employed including without limitation attestation with a TPM (trusted platform module), attestation with X.509 certificates, and symmetric key attestation. By executing these identity attestation operations external to (and yet accessible by) the device provisioning endpoint systems 102, a third party may provide an external, proprietary attestation service without risking disclosure of confidential practices.

After execution of the identity attestation, the external computing system returns an attestation result to the device provisioning endpoint system 102 in a communication phase 3. The attestation result may include a binary valid/invalid flag or some other indication of the validity of the provided registration identifier, as well as other attestation related data (e.g. meta-data providing audit information about the attestation operation, such as the version of the operation, the third-party provider, a time stamp, etc.).

The device provisioning endpoint system 102 evaluates the attestation result against a validity condition. In one implementation, the validity condition is satisfied if the binary flag indicates "valid." In other implementations, other indications of validity are tested to determine whether the provided registration identifier is valid, such as further evaluating whether the external attestation operation is up-to-date, that the timestamp on the attestation result is not stale, etc.

If the device provisioning endpoint system 102 detects that the attestation result satisfies the validity condition, then the device provisioning endpoint system 102 registers the pressure sensor 104 with the IoT hub 108 associated with the pressure sensor 104 in a communication phase 4. The IoT hub 108 returns device identifier information (e.g., a device identifier corresponding to the validated registration identifier) to the device provisioning endpoint system 102 in a communication phase 5.

The device provisioning endpoint system 102 transmits IoT hub connection information to the pressure sensor 104 in a communication phase 6. The pressure sensor 104 uses the IoT hub information to connect to the IoT hub 108, enabling communications between the pressure sensor 104 and the IoT hub 108 in a communication phase 7.

Figure 2:
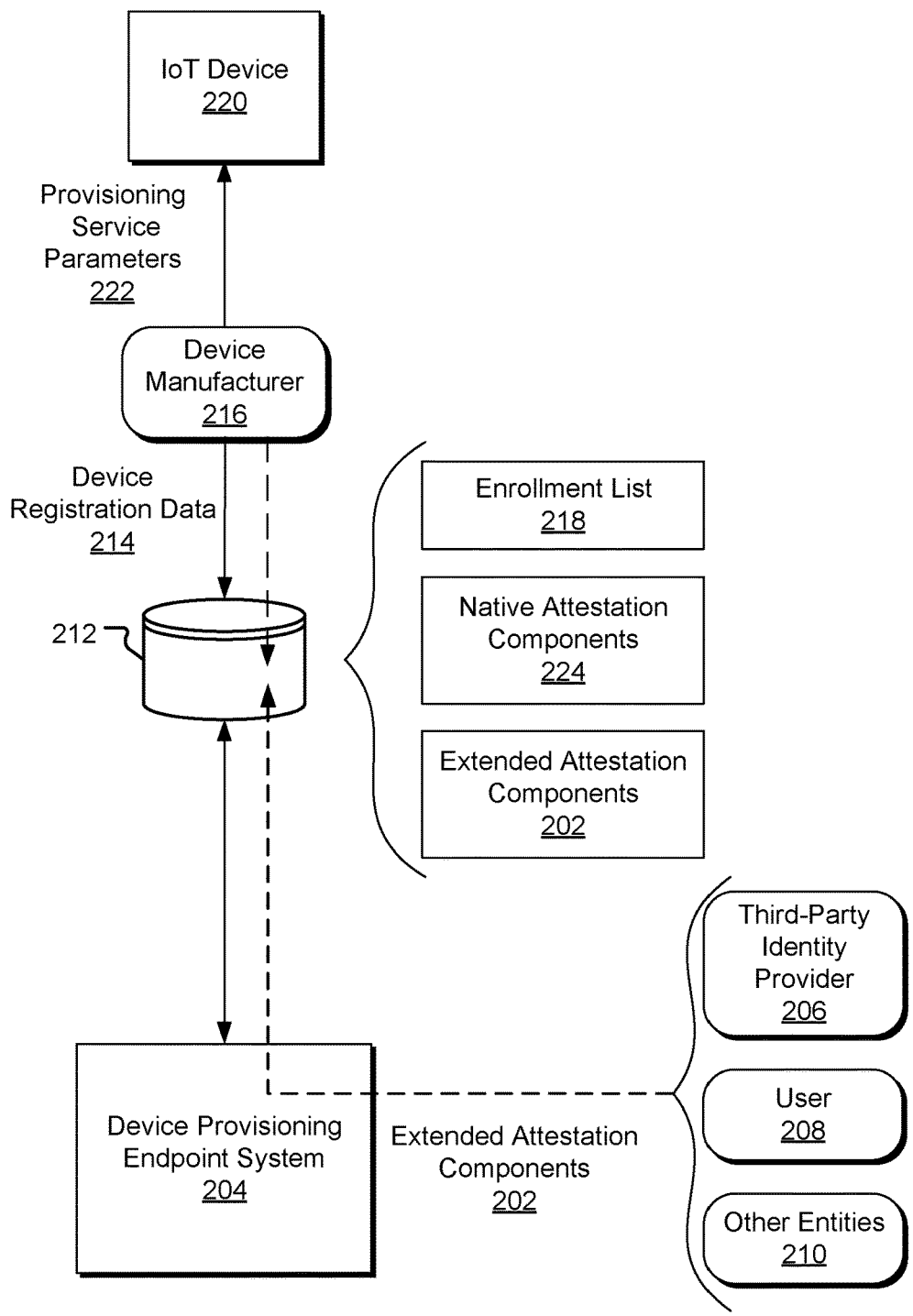
FIG. 2 illustrates an example extensible device identity attestation system being loaded with extended attestation components.

FIG. 2 illustrates an example extensible device identity attestation system 200 being loaded with extended attestation components 202. A device manufacturer 216 (or other responsible entity) of an IoT device (not shown) enrolls an IoT device 220 by recording device registration data 214 in an enrollment list 218 of an enrollment datastore 212 of a device provisioning endpoint system 204. For example, the IoT device 220 is manufactured at a factory, and the device manufacturer 216 records the device registration data 214, including a registration identifier of the IoT device 220, in the enrollment list 218 of the enrollment datastore 212 of the device provisioning endpoint system 204 for use when the IoT device 220 requests provisioning. Other device manufacturers may also record device registration data for their own manufactured IoT device in the same enrollment list 218.

The device manufacturer 216 also programs the IoT device 220 with a registration identifier for the IoT device 220 and provisioning service parameters 222 (e.g., identification, address, protocol) for the device provisioning endpoint system 204. The programmed provisioning service parameters 222 enable the IoT device 220 to call the provisioning service to obtain IoT hub connection information and/or an IoT service assignment with the IoT device is powered up.

In some implementations, the device manufacturer 216 also supplies the IoT device deployer/operator/user with identifying key information, such as confirming that all devices have an X.509 certificate generated from a signing certificate provided by the device deployer/operator/user, extracting the public portion of a TPM endorsement key from each TPM device, or other device identification solutions.

The device provisioning endpoint system 204 also stores native attestation components 224 in the enrollment datastore 212 or some other datastore. The native attestation components 224 include executable identity attestation components that can be used by and executed on the device provisioning endpoint system 204 to determine the validity of a purported registration identifier provided by an IoT device in a provisioning request. The enrollment datastore 212 (or another datastore) has recorded associations between select registration identifiers and select native attestation components that are to be used to validate the device identity.

In addition, the device provisioning endpoint system 204 is configured to store the extended attestation components 202 in the enrollment datastore 212 or some other datastore. The extended attestation components 202 include executable identity attestation components that can be used by and executed external to the device provisioning endpoint system 204 to determine the validity of a purported registration identifier provided by an IoT device in a provisioning request. In one implementation, each extended attestation component defines an application programming interface (API) or other protocol/format for communications between the device provisioning endpoint system 204 and the identified external computing system to test the validity of the registration identifier provided by the IoT device 220.

Various entities may submit extended attestation components 202 for use by the device provisioning endpoint system 204. For example, a third-party identity provider 206 can provide extended attestation components 202 that define a set of registration identifiers, policies, or other parameters that can be evaluated by the device provisioning endpoint system 204 against a registration identifier and/or other characteristics of an IoT device (not shown) to determine that the identity attestation should be performed by the external computing systems of the third-party identity provider 206. In an alternative implementation, an individual user 208 (e.g., a person or enterprise operating the IoT device) can provide extended attestation components 202 that define a set of registration identifiers, policies, or other parameters that can be evaluated by the device provisioning endpoint system 204 against a registration identifier and/or other characteristics of an IoT device (not shown) to determine that the identity attestation should be performed by an identified external computing system (such as the external computing system of the third-party identity provider 206). Other entities 210 (e.g., an identity attestation service broker, a manufacturer) may also provide their own extended attestation components 202 through the device provisioning endpoint systems.

The enrollment datastore 212 (or other datastore) has recorded associations between select registration identifiers and select extended attestation components that are to be used to validate the device identity using an external computing system. If a purported registration identifier is associated with an extended attestation component 202, then the device provisioning endpoint system 204 will connect with the external computing system associated with the extended attestation component 202, provide the purported registration identifier (and possibly additional data), and request identity attestation by the external computing system using an identity attestation process that the external computing system supports.

Figure 3:
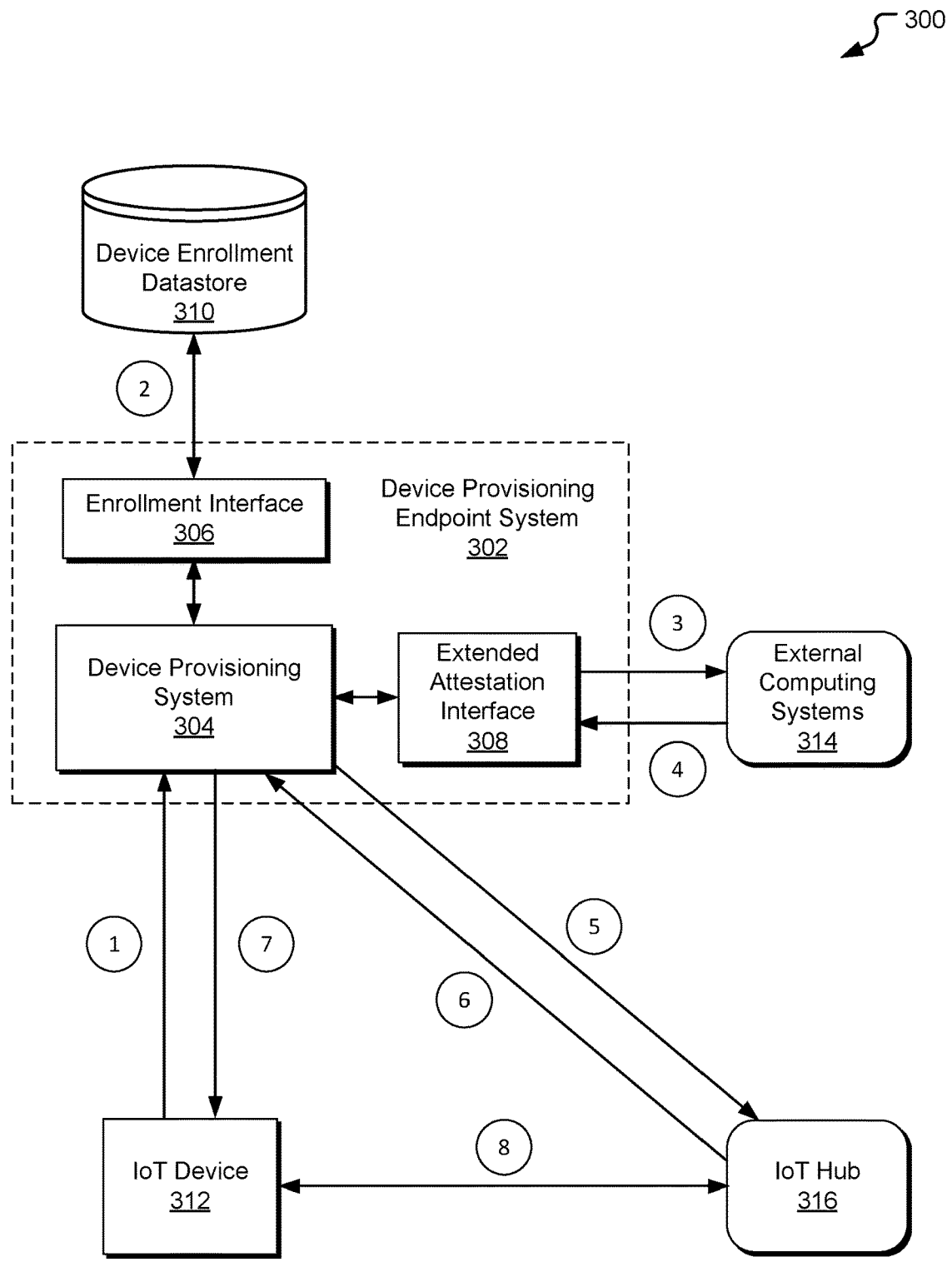
FIG. 3 illustrates an example extensible device identity attestation system using extended attestation components to perform identity attestation.

FIG. 3 illustrates an example extensible device identity attestation system 300 using extended attestation components to perform identity attestation. A device provisioning endpoint system 302 includes a device provisioning system 304, an enrollment interface 306, and an extended attestation interface 308. The device provisioning system 304 receives a provisioning request from an IoT device 312 and accesses a device enrollment datastore 310 to obtain one or more identity attestation components. If an identity attestation component is a native identity attestation component, the device provisioning system 304 or another system within the device provisioning endpoint system 302 executes the native identity attestation component in an effort to validate the identity of the IoT device 312. If an identity attestation component is an extended identity attestation component, the device provisioning system 304 or another system within the device provisioning endpoint system 302 off-loads the identity attestation operation for execution on one or more external computing systems 314 in an effort to validate the identity of the IoT device 312. If the identity of the IoT device 312 is validated, then the device provisioning system 304 provisions the IoT device 312.

The enrollment interface 306 includes storage interface circuitry (e.g., a Serial Attached SCSI circuit, a Serial Attached ATA interface circuit, network communication circuitry configured to interface with data storage systems) configured to access the device enrollment datastore 310, which stores registration identifiers supported by the extensible device identity attestation system 300, and to communicate between the device provisioning system 304 and the device enrollment datastore 310. In FIG. 3, the device enrollment datastore 310 also stores identity attestation components useful for determining the validity of registration identifier provided by an IoT device (such as an IoT device 312). Some of the identity attestation components may be native components executable by and on the device provisioning system 304. Other identity attestation components are extended attestation components associated with one or more systems of a set of external computing systems 314. The external computing systems 314 are external of the device provisioning endpoint system 302 and are likely owned/operated by a third party that is different than the entity that owns/operates the device provisioning endpoint system 302. In one implementation, the enrollment interface 306 provides the device provisioning system 304 with one or more of the following capabilities:

communicating with the device enrollment datastore 310 to store and access the extended device enrollment components;

looking up registration identifiers in the device enrollment datastore 310; and returning attestation components from the device enrollment datastore 310 for use by the device provisioning system 304 for validation of provided registration identifiers.

If the returned attestation component is a native attestation component, the device provisioning system 304 executes the native attestation component within the device provisioning endpoint system 302 to validate the associated registration identifier.

Alternatively, if the returned attestation component is an extended attestation component, the device provisioning system 304 accesses one or more external computing systems 314 via the extended attestation interface 308 to validate the associated registration identifier. The extended attestation interface 308 includes communication interface circuitry (e.g., network communication circuitry) configured to interface between the device provisioning system 304 and the one or more external computing systems 314. In one implementation, the extended attestation interface 308 provides the device provisioning system 304 with one or more of the following capabilities:

receiving from external computing systems, such as third-party identity providers and/or user computing system, extended device enrollment data specifying extensible device identity attestation parameters and/or executable instructions;

communicating with external computing systems, such as third-party identity providers, to execute identity attestation.

In an example device provision scenario, a device manufacturer stores device registration information for multiple IoT devices, e.g., a registration identifier, in the device enrollment datastore 310. In one implementation, the manufacturer can access the device enrollment list through a device provisioning portal associated with the device provisioning endpoint system 302. The manufacturer also stores registration identifier and an identifier of the associated device provisioning endpoint system 302 in each of the multiple IoT devices. In this manner, each IoT device is configured to contact the specified device provisioning endpoint system 302 to identify itself and to obtain the proper device configuration for a specified IoT hub and establish an initial connection between the IoT device and that IoT hub.

For example, one implementation of an extended device provisioning process includes:

1. An IoT device 312 sends a provisioning request to the device provisioning endpoint system in communication phase 1 (identified by the number "1" inside a circle in FIG. 3). In one implementation, the provisioning request includes a registration identifier of IoT device 312 and other registration data, although other formats of provisioning requests may be employed. From the perspective of the device provisioning endpoint system and its components, receiving the provisioning request occurs in a receiving operation.

2. The device provisioning system 304 of the device provisioning endpoint system 302 evaluates the received provisioning request against device enrollment data in the device enrollment datastore 310 in communication phase 2 and identifies and/or receives one or more native or extended attestation components in return if the registration identifier is found in the device enrolment datastore 310. Communications between the device provisioning system 304 and the device enrollment datastore 310 are processed through the enrollment interface 306. From the perspective of the device provisioning endpoint system and its components, evaluation of the received provisioning request against device enrollment data in the device enrollment datastore 310 occurs in an accessing operation.

3. If the evaluation result indicates that the IoT device 312 (e.g., the device that provided the received registration identifier) is configured for native identity attestation, then the device provisioning system 304 executes instructions in the native attestation component to execute identity attestation in the device provisioning endpoint system 302. Alternatively, if the evaluation result indicates that the IoT device 312 (e.g., the device that provided the received registration identifier) is configured for extended identity attestation, then the device provisioning system 304 executes instructions in the extended attestation component to off-load identity attestation to one or more of the external computing systems 314 (e.g., a third-party identity provider systems) in communication phase 3. In one implementation, the device provisioning system 304 transmits an extended identity attestation request to the one or more external computing systems 314, which provides the one or more external computing systems 314 with the provided registration identifier and other registration data, although other formats of extended identity attestation requests may be employed. It should be understood that one or more native identity attestation components and one or more extended attestation components may be executed for any particular registration identifier, depending on the associations recorded in the device enrollment datastore 310.

4. The one or more external computing systems 314 execute an identity attestation operation based on the registration identifier (and potentially other data) provided in the extended identity attestation request and return an external identity attestation result of the off-loaded identity attestation operation to the device provisioning system 304 in communication phase 4 (e.g., via the extended attestation interface 308).

5. If the identity attestation fails to satisfy a validity condition (e.g., the native or extended identity attestation returns an invalid result declaring the registration identifier invalid), the device provisioning system 304 rejects the provisioning request from the IoT device 312 in communication phase 7. If the identity attestation satisfies the validity condition (e.g., the native or extended identity attestation returns a valid result declaring the registration identifier valid), the device provisioning system 304 registers the IoT device 312 with an IoT hub 316 in communication phase 5 to initiate a provisioning operation.

6. The IoT hub 316 returns a device identifier and hub connection information to the device provisioning system 304 in communication phase 6.

7. The device provisioning system 304 returns the IoT hub connection information to the IoT device 312 in communication phase 7.

8. The IoT device 312 connects to the IoT hub 316 based on the returned IoT hub connection information and is configured for and interacts with the IoT hub 316 and associated IoT solutions in communications phase 8.

Figure 4:
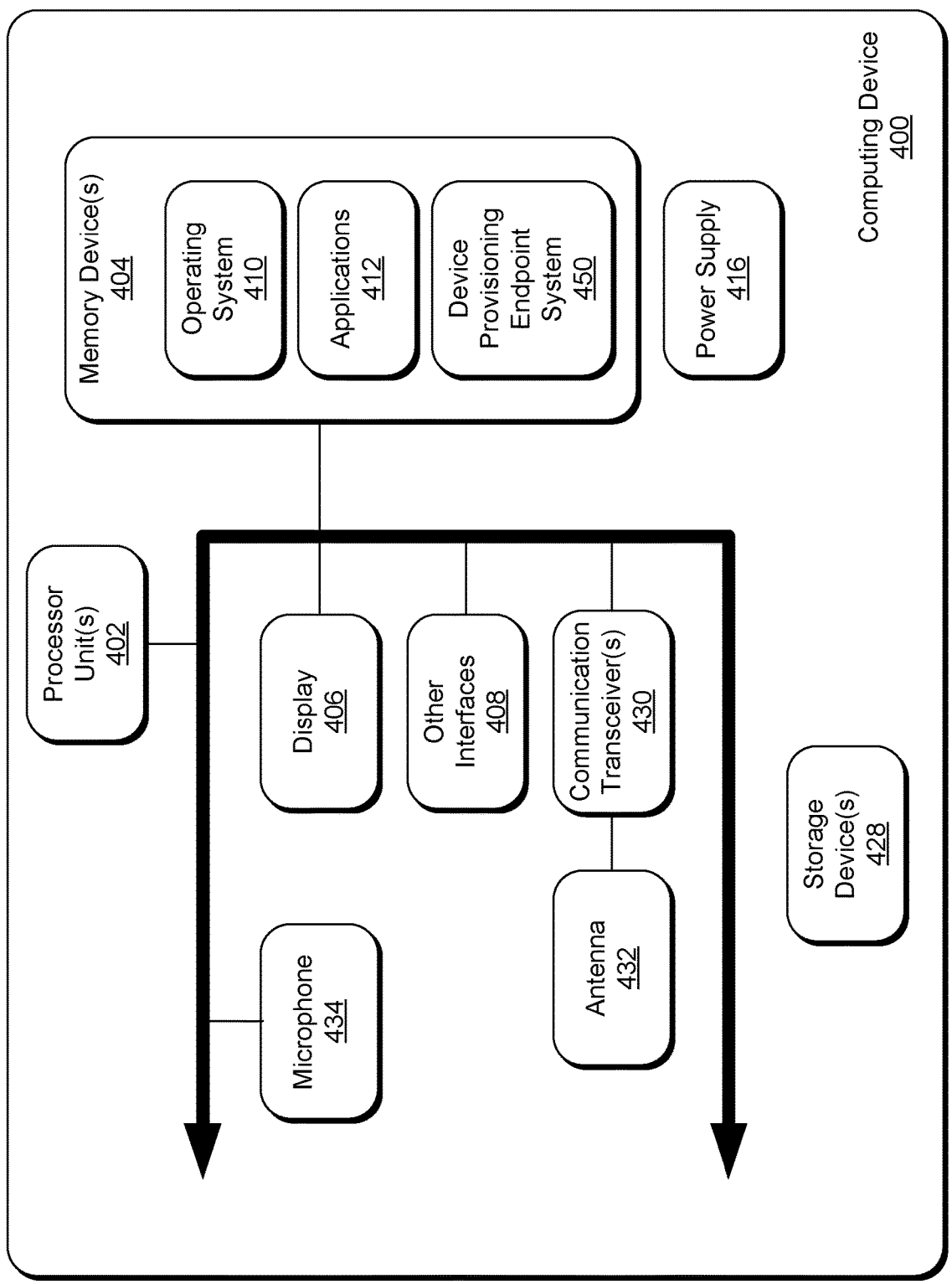
FIG. 4 illustrates an example computing device that may be useful in implementing the described technology to provide extensible device identity attestation.

FIG. 4 illustrates an example computing device that may be useful in implementing the described technology to provide extensible device identity attestation. The computing device 400 includes one or more processor units 402, one or more memory devices 404, a display 406 (e.g., a touchscreen display or lights), a microphone 434, and other interfaces 408 (e.g., buttons). The memory device(s) 404 generally includes either or both of volatile memory (e.g., RAM) and non-volatile memory (e.g., flash memory). An operating system 410, such as the Microsoft Windows® operating system or the Microsoft Windows® Mobile operating system, resides in the memory device(s) 404 and is executed by the processor unit(s) 402, although it should be understood that other operating systems may be employed.

One or more applications 412 may be loaded in the memory device(s) 404 and executed on the operating system 410 by the processor unit(s) 402. The computing device 400 includes a power supply 416, which is powered by one or more batteries or other power sources and which provides power to other components of the computing device 400. The power supply 416 may also be connected to an external power source that overrides or recharges the built-in batteries or other power sources.

The computing device 400 includes one or more communication transceivers 430 and an antenna 432 to provide network connectivity (e.g., a mobile phone network, Wi-Fi®, and BlueTooth®). The computing device 400 may also include various other components, such as a positioning system (e.g., a global positioning satellite transceiver), one or more accelerometers, one or more cameras, an audio interface (e.g., a microphone, an audio amplifier and speaker and/or audio jack), and one or more additional storage device(s) 428. Other configurations may also be employed.

In an example implementation, an operating system 410, various applications 412, a device provisioning endpoint system 450, identity attestation components (e.g., whether native or extended), and other modules and services may be embodied by instructions stored in the memory device(s) 404 and/or storage device(s) 428 and processed by the processing unit(s) 402. Registration identifiers, device identifiers, associated identity attestation components, encryption keys, security certificates, and other data may be stored in memory device(s) 404 and/or storage device(s) 428 as persistent datastores.

The computing device 400 may include a variety of tangible computer-readable storage media and intangible computer-readable communication signals, or alternatively, tangible processor-readable storage media and intangible processor-readable communication signals. Tangible computer-readable storage and tangible processor-readable storage can be embodied by any available media that can be accessed by the computing device 400 and includes both volatile and nonvolatile storage media, removable and non-removable storage media. Tangible computer-readable/processor-readable storage media excludes intangible communications signals and includes volatile and nonvolatile, removable and non-removable storage media implemented in any method or technology for storage of information such as computer/processor readable instructions, data structures, program modules or other data. Tangible computer-readable/processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 400. In contrast to tangible computer-readable/processor-readable storage media, intangible computer-readable/processor-readable communication signals may embody computer/processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible computer-readable/processor-readable storage medium to store logic. Examples of such a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer/processor program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method of provisioning a requesting device by obtaining extended identity attestation for the requesting device includes receiving a provisioning request at a device provisioning system. The provisioning request includes a registration identifier provided by the requesting device. A plurality of extended attestation components is accessed in an enrollment datastore of the device provisioning system. Each extended attestation component identifies an external computing system. One of the extended attestation components of the enrollment datastore is selected based on the registration identifier. Execution of the extended identity attestation at the external computing system identified by the selected extended attestation component is executed to yield an attestation result. The requesting device is provisioned from the device provisioning system, responsive to detection that the attestation result satisfies a validity condition.

Another example method of any preceding method provides an initiating operation that further includes communicating the registration identifier to the identified external computing system.

Another example method of any preceding method provides an accessing operation that further includes identifying one or more external computing systems of a plurality of external computing systems associated with the extended attestation components of the enrollment datastore of the device provisioning system. Each extended attestation component is associated with at least one registration identifier and at least one of the identified external computing systems at which to execute extended identity attestation to test validity of the registration identifier provided by the requesting device.

Another example method of any preceding method is provided wherein each extended attestation component defines an application programming interface (API) for communications between the device provisioning system and at least one of the identified external computing system to test the validity of the registration identifier provided by the requesting device.

Another example method of any preceding method is provided wherein the validity condition is satisfied when the attestation result indicates that the registration identifier provided by the requesting device is valid.

Another example method of any preceding method provides a provisioning operation that further includes registering the requesting device with an internet of things (IoT) hub.

Another example method of any preceding method provides a provisioning operation that further includes returning connection information of the IoT hub to the requesting device.

An example system for provisioning a requesting device by obtaining extended identity attestation for the requesting device includes a device provisioning system configured to receive a provisioning request at a device provisioning system. The provisioning request includes a registration identifier provided by the requesting device. An enrollment interface is communicatively connected to the device provisioning system and is configured to access a plurality of extended attestation components in an enrollment datastore of the device provisioning system. Each extended attestation component identifies an external computing system. The enrollment interface is further configured to select one of the extended attestation components in the enrollment datastore based on the registration identifier. An extended attestation interface is communicatively connected to the device provisioning system and is configured to initiate execution of the extended identity attestation at the external computing system identified by the selected extended attestation component to yield an attestation result. The extended attestation interface is further configured to detect that the attestation result satisfies a validity condition. The device provisioning system is configured to provision the requesting device from the device provisioning system, responsive to detection that the attestation result satisfies the validity condition.

Another example system of any preceding system is provided wherein the extended attestation interface is further configured to communicate the registration identifier to the identified external computing system.

Another example system of any preceding system is provided wherein the enrollment interface is further configured to identify one or more external computing systems of a plurality of external computing systems associated with the extended attestation components of the enrollment datastore of the device provisioning system. Each extended attestation component is associated with at least one registration identifier and at least one of the identified external computing systems at which to execute extended identity attestation to test validity of the registration identifier provided by the requesting device.

Another example system of any preceding system is provided wherein each attestation component defines an application programming interface (API) for communications between the device provisioning system and at least one of the identified external computing system to test validity of the registration identifier provided by the requesting device.

Another example system of any preceding system is provided wherein the validity condition is satisfied when the attestation result indicates that the registration identifier provided by the requesting device is valid.

Another example system of any preceding system is provided wherein the device provisioning system is configured to register the requesting device with an internet of things (IoT) hub, responsive to satisfaction of the validity condition.

Another example system of any preceding system is provided wherein the device provisioning system is configured to return connection information of the IoT hub to the requesting device, responsive to registration of the requesting device with the IoT hub.

One or more tangible processor-readable storage media of a tangible article of manufacture encode processor-executable instructions for executing on an electronic computing system an example process of provisioning a requesting device by obtaining extended identity attestation for the requesting device. The example process includes receiving a provisioning request at a device provisioning system. The provisioning request includes a registration identifier provided by the requesting device. A plurality of extended attestation components is accessed in an enrollment datastore of the device provisioning system, each extended attestation component identifying an external computing system. One of the extended attestation components in the enrollment datastore is selected based on the registration identifier. Execution of the extended identity attestation is initiated at the external computing system identified by the selected extended attestation component to yield an attestation result. Satisfaction of the validity condition by the attestation result is detected. The requesting device is provisioned from the device provisioning system, responsive to detecting that the attestation result satisfies the validity condition.

One or more tangible processor-readable storage media of any preceding claim provide another example process wherein the initiating operation further includes communicating the registration identifier to the identified external computing system.

One or more tangible processor-readable storage media of any preceding claim provide another example process wherein the accessing operation includes identifying one or more external computing systems of a plurality of external computing systems associated with the extended attestation components of the enrollment datastore of the device provisioning system. Each extended attestation component is associated with at least one registration identifier and at least one of the identified external computing systems at which to execute extended identity attestation to test validity of the registration identifier provided by the requesting device.

One or more tangible processor-readable storage media of any preceding claim provide another example process wherein each extended attestation component defines an application programming interface (API) for communications between the device provisioning system and at least one of the identified external computing system to test validity of the registration identifier provided by the requesting device.

One or more tangible processor-readable storage media of any preceding claim provide another example process wherein the validity condition is satisfied when the attestation result indicates that the registration identifier provided by the requesting device is valid.

One or more tangible processor-readable storage media of any preceding claim provide another example process wherein the provisioning operation includes registering the requesting device with an internet of things (IoT) hub, responsive to satisfaction of the validity condition, and returning connection information of the IoT hub to the requesting device, responsive to registering of the requesting device with the IoT hub.

An example system for provisioning a requesting device by obtaining extended identity attestation for the requesting device includes means for receiving a provisioning request at a device provisioning system. The provisioning request includes a registration identifier provided by the requesting device. The example system also includes means for accessing a plurality of extended attestation components in an enrollment datastore of the device provisioning system. Each extended attestation component identifies an external computing system. The example system also includes means for selecting one of the extended attestation components of the enrollment datastore based on the registration identifier. The example system also includes means for initiating execution of the extended identity attestation at the external computing system identified by the selected extended attestation component to yield an attestation result. The example system also includes means for provisioning the requesting device from the device provisioning system, responsive to detection that the attestation result satisfies a validity condition.

Another example system of any preceding system is provided wherein the means for initiating includes means for communicating the registration identifier to the identified external computing system.

Another example system of any preceding system is provided wherein the means for accessing includes means for identifying one or more external computing systems of a plurality of external computing systems associated with the extended attestation components of the enrollment datastore of the device provisioning system. Each extended attestation component is associated with at least one registration identifier and at least one of the identified external computing systems at which to execute extended identity attestation to test validity of the registration identifier provided by the requesting device.

Another example system of any preceding system is provided wherein each extended attestation component defines an application programming interface (API) for communications between the device provisioning system and at least one of the identified external computing system to test the validity of the registration identifier provided by the requesting device.

Another example system of any preceding system is provided wherein the validity condition is satisfied when the attestation result indicates that the registration identifier provided by the requesting device is valid.

Another example system of any preceding system is provided wherein the means for provisioning includes means for registering the requesting device with an internet of things (IoT) hub.

Another example system of any preceding system is provided wherein the means for provisioning includes means for returning connection information of the IoT hub to the requesting device.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of provisioning a requesting device by obtaining extended identity attestation for the requesting device, the method comprising:
   receiving a provisioning request at a device provisioning system, the provisioning request including a registration identifier provided by the requesting device;
   accessing a plurality of extended attestation components in an enrollment datastore of the device provisioning system, each extended attestation component identifying an external computing system;
   selecting one of the extended attestation components of the enrollment datastore based on the registration identifier;
   initiating execution of the extended identity attestation at the external computing system identified by the selected extended attestation component to yield an attestation result; and
   provisioning the requesting device from the device provisioning system, responsive to detection that the attestation result satisfies a validity condition, the provisioning operation including registering the requesting device with an internet of things (IoT) hub and returning connection information of the IoT hub to the requesting device.

2. The method of claim 1 wherein the initiating operation further comprises:
   communicating the registration identifier to the identified external computing system.

3. The method of claim 1 wherein the accessing operation comprises:
   identifying one or more external computing systems of a plurality of external computing systems associated with the extended attestation components of the enrollment datastore of the device provisioning system, each extended attestation component being associated with at least one registration identifier and at least one of the identified external computing systems at which to execute extended identity attestation to test validity of the registration identifier provided by the requesting device.

4. The method of claim 3 wherein each extended attestation component defines an application programming interface (API) for communications between the device provisioning system and at least one of the identified external computing system to test the validity of the registration identifier provided by the requesting device.

5. The method of claim 1 wherein the validity condition is satisfied when the attestation result indicates that the registration identifier provided by the requesting device is valid.

6. A system for provisioning a requesting device by obtaining extended identity attestation for the requesting device, the system comprising:

a device provisioning system configured to receive a provisioning request at a device provisioning system, the provisioning request including a registration identifier provided by the requesting device;

an enrollment interface communicatively connected to the device provisioning system and configured to access a plurality of extended attestation components in an enrollment datastore of the device provisioning system, each extended attestation component identifying an external computing system, the enrollment interface being further configured to select one of the extended attestation components in the enrollment datastore based on the registration identifier; and an extended attestation interface communicatively connected to the device provisioning system and configured to initiate execution of the extended identity attestation at the external computing system identified by the selected extended attestation component to yield an attestation result, the extended attestation interface being further configured to detect that the attestation result satisfies a validity condition when the attestation result indicates that the registration identifier provided by the requesting device is valid, wherein the device provisioning system is configured to provision the requesting device from the device provisioning system, responsive to detection that the attestation result satisfies the validity condition;

wherein the device provisioning system is configured to register the requesting device with an internet of things (IoT) hub, responsive to satisfaction of the validity condition, and the device provisioning system is configured to return connection information of the IoT hub to the requesting device, responsive to registration of the requesting device with the IoT hub.

7. The system of claim 6 wherein the extended attestation interface is further configured to communicate the registration identifier to the identified external computing system.

8. The system of claim 6 wherein the enrollment interface is further configured to identify one or more external computing systems of a plurality of external computing systems associated with the extended attestation components of the enrollment datastore of the device provisioning system, each extended attestation component being associated with at least one registration identifier and at least one of the identified external computing systems at which to execute extended identity attestation to test validity of the registration identifier provided by the requesting device.

9. The system of claim 6 wherein each attestation component defines an application programming interface (API) for communications between the device provisioning system and at least one of the identified external computing system to test validity of the registration identifier provided by the requesting device.

10. One or more tangible processor-readable storage media of a tangible article of manufacture encoding processor-executable instructions for executing on an electronic computing system a process of provisioning a requesting device by obtaining extended identity attestation for the requesting device, the process comprising:

receiving a provisioning request at a device provisioning system, the provisioning request including a registration identifier provided by the requesting device;

accessing a plurality of extended attestation components in an enrollment datastore of the device provisioning system, each extended attestation component identifying an external computing system;

selecting one of the extended attestation components in the enrollment datastore based on the registration identifier;

initiating execution of the extended identity attestation at the external computing system identified by the selected extended attestation component to yield an attestation result;

detecting that the attestation result satisfies a validity condition;

provisioning the requesting device from the device provisioning system, responsive to detecting that the attestation result satisfies the validity condition when the attestation result indicates that the registration identifier provided by the requesting device is valid;

registering the requesting device with an internet of things (IoT) hub, responsive to satisfaction of the validity condition; and returning connection information of the IoT hub to the requesting device, responsive to registering of the requesting device with the IoT hub.

11. The one or more tangible processor-readable storage media of claim 10 wherein the initiating operation further comprises:

communicating the registration identifier to the identified external computing system.

12. The one or more tangible processor-readable storage media of claim 10 wherein the accessing operation comprises:

identifying one or more external computing systems of a plurality of external computing systems associated with the extended attestation components of the enrollment datastore of the device provisioning system, each extended attestation component being associated with at least one registration identifier and at least one of the identified external computing systems at which to execute extended identity attestation to test validity of the registration identifier provided by the requesting device.

13. The one or more tangible processor-readable storage media of claim 12 wherein each extended attestation component defines an application programming interface (API) for communications between the device provisioning system and at least one of the identified external computing system to test validity of the registration identifier provided by the requesting device.

* * * * *